US011831227B2

(12) United States Patent
Kim et al.

(10) Patent No.: US 11,831,227 B2
(45) Date of Patent: Nov. 28, 2023

(54) MOTOR COVER STRUCTURE

(71) Applicants: HYUNDAI MOTOR COMPANY, Seoul (KR); KIA CORPORATION, Seoul (KR)

(72) Inventors: Shin Jong Kim, Hwaseong-si (KR); Jong Hyun Kim, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 91 days.

(21) Appl. No.: 17/470,098

(22) Filed: Sep. 9, 2021

(65) Prior Publication Data

US 2022/0109351 A1 Apr. 7, 2022

(30) Foreign Application Priority Data

Oct. 5, 2020 (KR) .......................... 10-2020-0127859

(51) Int. Cl.
*H02K 9/19* (2006.01)
*H02K 5/20* (2006.01)
*H02K 9/197* (2006.01)

(52) U.S. Cl.
CPC .............. *H02K 9/19* (2013.01); *H02K 5/203* (2021.01); *H02K 9/197* (2013.01)

(58) Field of Classification Search
CPC ............ H02K 5/20; H02K 5/203; H02K 9/19; H02K 9/193; H02K 9/197

USPC ...................................................... 310/54, 57
See application file for complete search history.

(56) References Cited

U.S. PATENT DOCUMENTS

| 2012/0080286 A1* | 4/2012 | Kasuya | ..................... B60K 6/48 |
| | | | 192/113.3 |
| 2013/0038151 A1* | 2/2013 | Ohashi | ................... H02K 7/088 |
| | | | 310/59 |
| 2022/0109352 A1* | 4/2022 | Kim | ......................... H02K 9/26 |

FOREIGN PATENT DOCUMENTS

WO WO-2020111186 A1 * 6/2020 ............. F04D 13/06

OTHER PUBLICATIONS

Kaneko et al. WO 2020/111186 A1 machine translation (Year: 2020).*

* cited by examiner

*Primary Examiner* — Quyen P Leung
*Assistant Examiner* — Minki Chang
(74) *Attorney, Agent, or Firm* — McDonnell Boehnen Hulbert & Berghoff LLP

(57) ABSTRACT

A motor cover structure sealing a housing of a motor includes a partition wall disposed on one side of a stator disposed within the motor to contact a cover contacting the housing, and a body part mounted with the partition wall, in which an oil recovery line is defined between the partition wall and the body part, and the oil flows to the oil recovery line in a space of one side of a rotor disposed within the motor.

8 Claims, 3 Drawing Sheets

MOTOR COVER STRUCTURE

CROSS REFERENCE TO RELATED APPLICATIONS

This application claims under 35 U.S.C. § 119(a) the benefit of priority to Korean Patent Application No. 10-2020-0127859 filed on Oct. 5, 2020, the entire contents of which are incorporated herein by reference.

BACKGROUND

(a) Technical Field

The present disclosure relates to a motor cover structure in which an oil recovery line is defined within a motor cover.

(b) Background Art

An eco-friendly vehicle is provided with a motor configured to drive a vehicle with a power source of a high-voltage battery. The motor is composed of main components for generating an output such as a permanent magnet, a core, and a coil, and heat occurs in the motor by electric resistance and magnetic resistance occurring in the main components when a current or a magnetic force flows. Therefore, in the high-temperature condition having a predetermined temperature or more, a phenomenon in which the component performance irreversibly deteriorates may occur, and the deterioration may damage the component and lower the motor performance. Therefore, to maintain the motor performance, the cooling should be provided for maintaining the motor temperature at a predetermined level.

Conventionally, to cool the motor, a method for installing a cooling pipe in a motor housing, and injecting the oil delivered through the cooling pipe to a stator is adopted. The oil cooling the components of the motor are cooled again using a separate heat exchanger. However, there are problems with increasing the weight of the cooling structure and the cost for implementing the cooling structure due to the configuration such as the cooling pipe and an injection nozzle for injecting the oil. The path through which the oil flows should be separately configured inside the motor to delete the cooling pipe and the injection nozzle, but when the oil flow path is separately formed, the entire length of the motor may not be reduced.

The above information disclosed in this Background section is only for enhancement of understanding of the background of the disclosure and accordingly it may include information that does not form the prior art that is already known in this country to a person of ordinary skill in the art.

SUMMARY

An object of the present disclosure is to provide a motor cover structure applied to a motor cooling structure in which a cooling pipe and an injection nozzle for reducing the entire length of the motor and cooling the components of the motor are removed.

Another object of the present disclosure is to provide a motor cover structure capable of reducing the entire length of a motor by defining an oil recovery line within a motor cover.

Provided is a motor cover structure according to an exemplary embodiment of the present disclosure. A motor cover structure sealing a housing of a motor includes a partition wall disposed on one side of a stator disposed within the motor to contact a cover contacting the housing, and a body part mounted with the partition wall, in which an oil recovery line is defined between the partition wall and the body part, and the oil flows to the oil recovery line in a space of one side of a rotor disposed within the motor.

According to an example, the cover separates a space in which the stator and the rotor are disposed, and the space between the stator and the housing is divided into a first chamber defined by the cover disposed on one side of the stator and the partition wall, a second chamber defined by the cover disposed on one side of the stator, the stator, and the housing, a third chamber defined by the cover disposed on the other side of the stator, the stator, and the housing, and a fourth chamber defined by the cover disposed on the other side of the stator and the housing.

According to an example, the partition wall is in contact with the cover such that the oil within the first chamber, the second chamber, the third chamber, and the fourth chamber is not directly introduced into the oil recovery line.

According to an example, the oil cooling the rotor flows through the oil recovery line, and the oil recovery line is connected to an inlet of an oil housing disposed on the housing.

According to an example, a hollow part into which the rotary shaft of the motor is inserted and a first concave part mounted with a sealing member for sealing between the motor cover and the housing are defined in the body part, and a second concave part connected to the first concave part and mounted with the sealing member is defined in the partition wall.

According to an example, the oil recovery line is defined outside the motor cover compared to the location at which the sealing member is disposed with respect to the direction in which the rotary shaft of the motor extends.

According to an example, the oil recovery line includes a cover inlet through which the oil cooling the rotor is introduced and a cover discharging port for discharging the oil to an oil housing disposed on the housing, and the cover inlet is defined adjacent to the hollow part compared to the cover discharging port.

According to an example, the oil recovery line is defined at the location overlapping the stator in the direction in which the rotary shaft of the motor extends.

The exemplary embodiment of the present disclosure may delete the cooling pipe used to cool the components of the motor through the oil injection method by cooling the components of the motor through the flow paths defined within the housing. The entire length of the motor may be reduced by removing the cooling pipe.

The exemplary embodiment of the present disclosure may reduce the entire length of the motor through the oil recovery line defined within the motor cover.

The exemplary embodiment of the present disclosure may form the flow path inside the motor cover without forming the separate flow path inside the housing to recover the oil cooling the rotor into the oil housing.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

BRIEF DESCRIPTION OF THE FIGURES

The above and other features of the present disclosure will now be described in detail with reference to certain exemplary examples thereof illustrated in the accompanying drawings which are given herein below by way of illustration only, and thus are not limitative of the present disclosure, and wherein.

Figure 1:
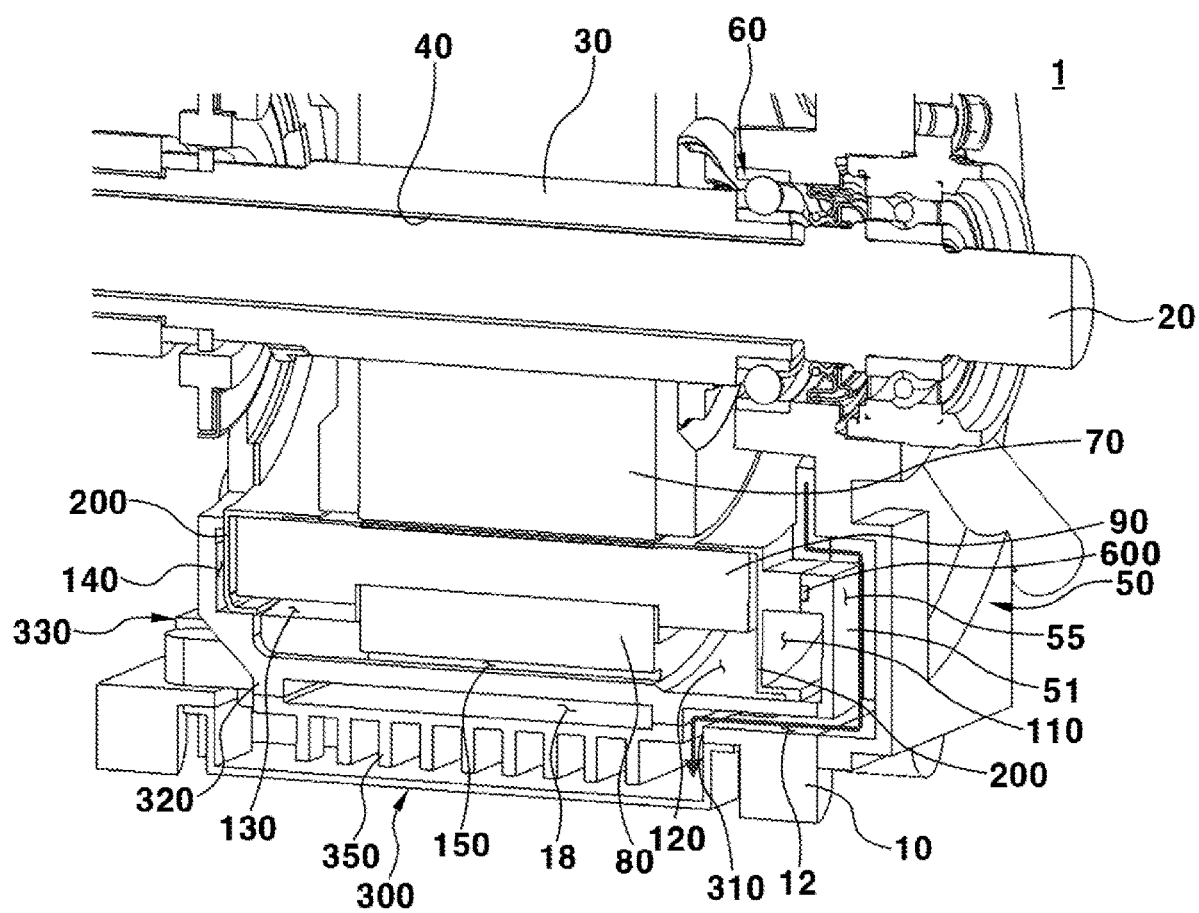
FIG. 1 is a diagram for explaining an oil recovery structure for cooling a motor according to an exemplary embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

The advantages and features of the present disclosure, and the method for achieving them may be clarified with reference to the exemplary embodiment to be described later together with the accompanying drawings. However, the present disclosure is not limited to the exemplary embodiment disclosed below but may be implemented in various different forms, and the present exemplary embodiment is merely provided to complete the disclosure of the present disclosure, and to fully notify those skilled in the art to which the present disclosure pertains of the scope of the disclosure, and the present disclosure is defined by only the scope of the claims. Throughout the specification, the same reference numerals indicate the same components.

Further, in the present specification, distinguishing the names of the components into a first, a second, and the like is to distinguish them because the names of the components are the same, and the names are not limited to the order thereof in the following description.

The detailed description merely exemplifies the present disclosure. Further, the aforementioned contents illustrate and describe the preferred exemplary embodiment of the present disclosure, and the present disclosure may be used in various combination, changes, and environments. That is, the present disclosure may be changed or modified within the range of the concept of the disclosure disclosed in the present specification, the range equivalent to the disclosed contents, and/or the range of the technology or knowledge in the art. The described exemplary embodiment describes the best mode for implementing the technical spirit of the present disclosure, and various changes required in the specific applications and uses of the present disclosure are also possible. Therefore, the detailed description of the disclosure is not intended to limit the present disclosure to the disclosed exemplary embodiment. Further, the appended claims should be interpreted as also including other exemplary embodiments.

FIG. 1 is a diagram for explaining an oil recovery structure for cooling a motor according to an exemplary embodiment of the present disclosure.

Referring to FIG. 1, a motor 1 may include a rotor 70 connected to rotary shafts 20, 30, stators 80, 90 disposed on the rotor 70, a housing 10 surrounding the rotor 70 and the stators 80, 90, and an oil housing 300 disposed on the housing 10. An oil recovery structure for cooling the motor 1 according to an exemplary embodiment of the present disclosure relates to a structure in which the oil cooling the rotor 70, the oil cooling a reducer (not illustrated), and the oil cooling rotary shafts 20, 30 and a bearing 60 contacting the rotary shafts 20, 30 are introduced into the oil housing 300.

A structure of cooling the motor 1 may adopt a method for cooling a stator core 80 and coils 90 through chambers 110, 120, 130, 140 filled with the oil and a channel 150 within the housing 10, rather than a cooling method for injecting the oil into the stators 80, 90. The rotary shafts 20, 30 may be composed of a rotor shaft 30 connected to the rotor 70 and an inner shaft 20 which is the center axis of the motor. The oil introduced through an oil inlet (not illustrated) defined in the housing 10 may be introduced into the chamber 110 to cool the stator 70. Further, the introduced oil may flow to a shaft cooling flow path 40 defined between the inner shaft 20 and the rotor shaft 30 to cool the rotor shaft 30 and the bearing 60. A cooling pipe is required for the oil injection method, which is the conventional cooling method, but the oil recovery structure for cooling the motor according to the exemplary embodiment of the present disclosure may cool the rotor 70, the stators 80, 90, the rotor shaft 30, and the bearing 60 through the flow paths defined inside the motor 1.

A cover 200 may be disposed on one sides of the stators 80, 90 disposed within the motor 1 to be in contact with the housing 10. One sides of the stators 80, 90 may mean the locations adjacent to the motor cover 50 to be described later. The cover 200 may divide a space in which the stators 80, 90 and the rotor 70 disposed within the motor 1 are disposed. Specifically, the cover 200 may divide a space between the stators 80, 90 and the housing 10 into a plurality of chambers 110, 120, 130, 140. The space between the stators 80, 90 and the housing 10 may be divided into a first chamber 110, a second chamber 120, a third chamber 130, and a fourth chamber 140. The cover 200 may be disposed to surround the side surface of the coil 90 which is one configuration of the stators 80, 90. The cover 200 may be in contact with the housing 10, and the housing 10 is sealed such that the oil introduced into the stators 80, 90 is not introduced into the rotor 70. However, the cover 200 may divide the space in which the stators 80, 90 and the rotor 70 are disposed within the housing 10, but the rotor 70 may be cooled by holes (not illustrated) defined in the cover 200.

The cover 200 may be disposed outside the coils 90 with respect to the stator core 80 and provided to extend along the inner circumferential surface of the coils 90. The inner circumferential surfaces of the coils 90 may mean the surfaces facing the rotary shafts 20, 30. One cover 200 may be disposed on each of both sides with respect to the stator core 80. The cover 200 may be in contact with the housing 10 to seal the space between the stators 80, 90 and the housing 10. The oil may flow between the chambers 110, 120, 130, 140 which are the sealed spaces through the holes (not illustrated) of the cover 200 disposed on both sides of the stator core 80. The oil introduced into the first chamber 110 may flow to the second chamber 120 through the holes (not illustrated) of the cover 200 disposed on one side of the stator core 80, the oil may flow from the second chamber 120 to the third chamber 130 through the channel 150, and the oil may flow from the third chamber 130 to the fourth chamber 140 through the holes (not illustrated) of the cover 200 disposed on the other side of the stator core 80. That is, the oil may cool the stators 80, 90 while flowing within the chambers 110, 120, 130, 140.

To seal the housing 10, a motor cover 50 may be disposed on the rear side of the motor 1. The motor cover 50 may include a partition wall 51 contacting the cover 200. The motor cover 50 may be in contact with the cover 200 to separate the chambers 110, 120, 130, 140 from the space in which the rotor 70 is disposed. The first chamber 110 may be defined by the cover 200 and the partition wall 51 disposed on one sides of the stators 80, 90. The second chamber 120 may be defined by the cover 200 disposed on one sides of the stators 80, 90, the stators 80, 90 and the housing 10. The third chamber 130 may be defined by the cover 200 disposed on the other sides of the stators 80, 90, the stators 80, 90, and the housing 10. The fourth chamber 140 may be defined by the cover 200 disposed on the other sides of the stators 80, 90 and the housing 10. One side of the partition wall 51 may be disposed at the location being spaced than the boundary between the stators 80, 90 and the rotor 70 with respect to a rotary shaft 20. One side of the partition wall 51 may mean the upper portion with respect to the placement direction of the housing 10. That is, one point of the partition wall 51 disposed most adjacent to the rotary shaft 20 may be defined as one side of the partition wall 51. The other side of the partition wall 51 may be disposed adjacent to an inner flow path 12 of the housing 10.

An oil recovery line 55 through which the oil is introduced from the space defined on one side of the rotor 70, may be defined on the motor cover 50. The oil recovery line 55 may be positioned at the location overlapping the stators 80, 90 in the direction in which the rotary shafts 20, 30 extend. The partition wall 51 may be in contact with the cover 200 to prevent the oil within the chambers 110, 120, 130, 140 from being directly introduced into the oil recovery line 55.

The oil housing 300 may include a first inlet 310 through which the oil is introduced from the space defined on one side of the rotor 70, a second inlet 320 through which the oil is introduced from a reducer (not illustrated) connected to the rotary shafts 20, 30, and a discharging port 330 discharging the oil inside the oil housing 300 to an oil filter (not illustrated). The oil housing 300 may be disposed on the lower end of the housing 10 with respect to the placement direction of the motor 1. That is, the oil housing 300 may be disposed to overlap the direction from the rotary shafts 20, 30 toward the stators 80, 90.

The channel cover 350 contacting the housing 10 may be disposed within the oil housing 300. The space defined by the oil housing 300 and the channel cover 350 may be defined as an oil sump. That is, the oil sump may mean the space in which the oil for cooling the motor 1 is recovered. The channel cover 350 may include pins 355 extending in the direction from the rotary shafts 20, 30 toward the stators 80, 90. The space between the housing 10 and the channel cover 300 may be defined as a coolant channel 18 through which coolant flows. The coolant channel 18 may be disposed within the housing 10. The coolant channel 18 may be formed within the housing 10 in the directions in which the rotary shafts 20, 30 rotate (or the circumferential directions of the rotary shafts 20, 30). The channel cover 350 may be in surface contact with the coolant channel 18, and the oil within the oil housing 300 may be cooled by the coolant flowing within the coolant channel 18.

The oil introduced from the space defined on one side of the rotor 70 may be introduced into the oil recovery line 55, and the oil passing through the oil recovery line 55 may be introduced into an inner flow path 12 defined on the lower end of the housing 10. That is, the oil cooling the rotor 70 may flow through the oil recovery line 55. The inner flow path 12 is connected to the first inlet 310, such that the oil may flow to the oil housing 300. That is, the inner flow path 12 may connect the oil recovery line 55 to the first inlet 310. The inner flow path 12 may be defined on one side (i.e., lower end) of the housing 10 in which the oil housing 300 is disposed, and the inner flow path 12 may be defined at the location which overlaps the cover 200 from the rotary shafts 20, 30 toward the stators 80, 90. The inner flow path 12 may be defined outside the coolant channel 18 with respect to the directions in which the rotary shafts 20, 30 extend. The oil introduced from the space defined on one side of the rotor 70 may be the oil cooling the bearing 60 and the rotor 70. The oil introduced through the inlet 15 may flow toward the bearing 60 and the shaft cooling flow path 40, and the oil passing through the shaft cooling flow path 40 may be introduced into the second inlet 320 after passing through a reducer (not illustrated).

According to the exemplary embodiment of the present disclosure, the oil cooling the bearing 60 and the rotor 70, and the oil cooling the rotor shaft 30 and the reducer (not illustrated) may be introduced into the oil housing 300 to exchange heat with the coolant flowing through the coolant channel 18.

According to the exemplary embodiment of the present disclosure, as the components of the motor 1 are cooled by the flow paths defined within the housing 10, the cooling pipe used to cool the components of the motor 1 through the oil injection method may be deleted. The entire length of the motor 10 may be reduced by deleting the cooling pipe.

The exemplary embodiment of the present disclosure may reduce the entire length of the motor 1 through the oil recovery line 55 defined within the motor cover 50.

Figure 2:
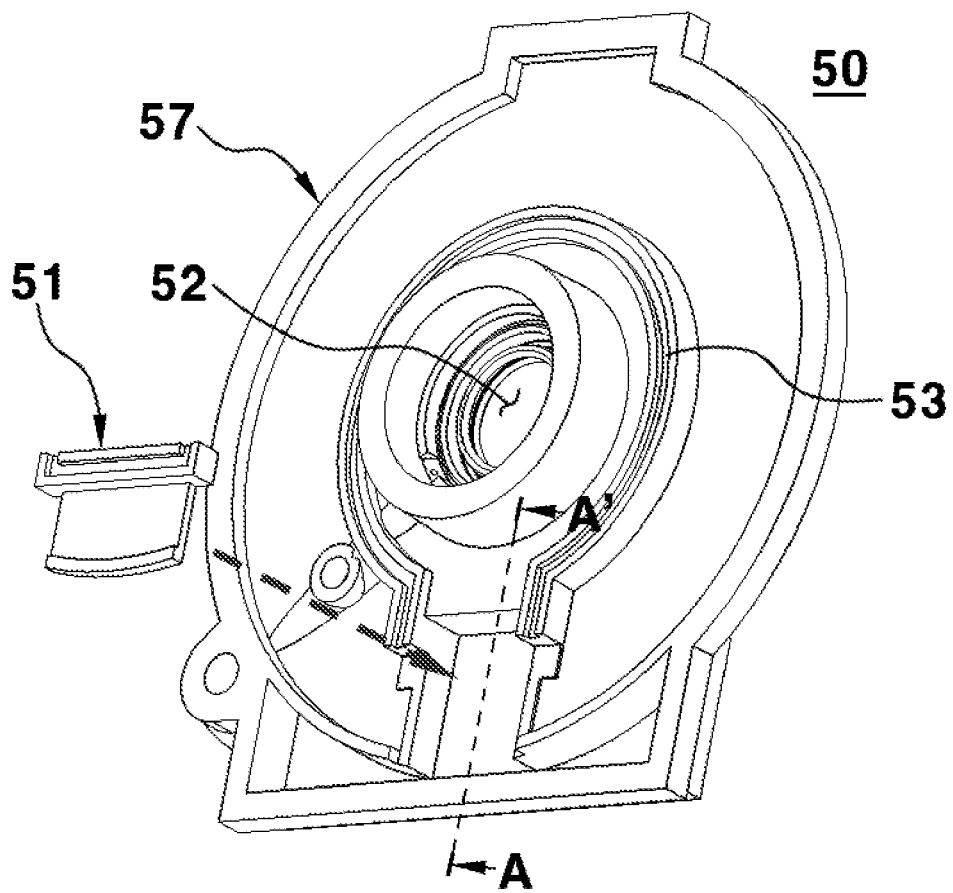
FIG. 2 is a diagram illustrating a motor cover according to the present disclosure.
Figure 3:
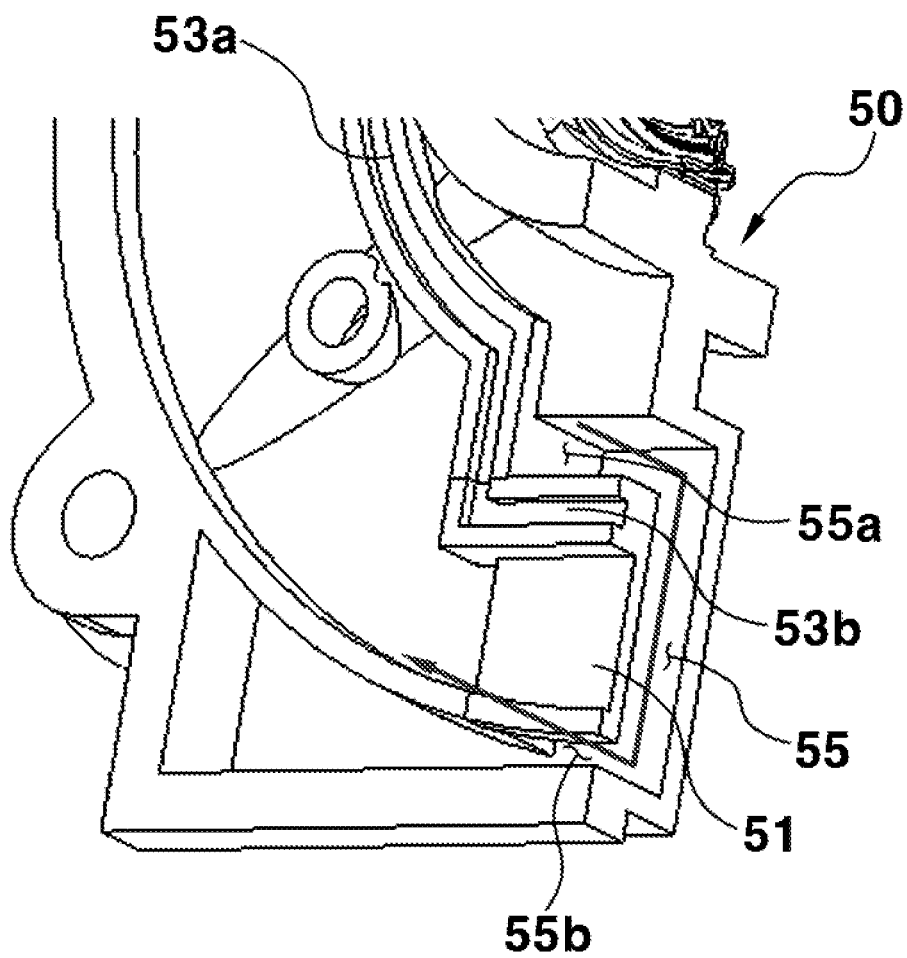
FIG. 3 is a cross-sectional diagram taken along the line A-A' illustrated in FIG. 2.

FIG. 2 is a diagram illustrating the motor cover according to the present disclosure, and FIG. 3 is a cross-sectional diagram taken along the line A-A' illustrated in FIG. 2.

Referring to FIGS. 1 to 3, the motor cover 50 may include the partition wall 51 contacting the cover 200 disposed on one sides of the stators 80, 90 and a body part 57 mounted with the partition wall 51. The lower end of the motor cover 50 may be formed with a space being recessed in the directions in which the rotary shafts 20, 30 extend, and the oil recovery line 55 may be formed by covering the recessed space with the partition wall 51. For example, the partition wall 51 may be a component being detached and attached to the body part 57. Therefore, the oil recovery line 55 may mean a space between the partition wall 51 and the body part 57. The width of the partition wall 51 may determine the flow path width of the oil recovery line 55. The width of the partition wall 51 may mean the horizontal width with respect to the installation direction of the motor 1 in the direction perpendicular to the directions in which the rotary shafts 20, 30 extend.

A hollow part 52 into which the rotary shafts 20, 30 of the motor 1 are inserted and a concave part 53 mounted with a sealing member 600 for sealing between the motor cover 50 and the housing 10 may be defined on the motor cover 50. The concave part 53 may include a first concave part 53a defined on the body part 57 and a second concave part 53*b* defined on the partition wall 51. The first concave part 53*a* and the second concave part 53*b* may be connected to each other.

The oil recovery line 55 may be the flow path bent in a "U" shape. The oil recovery line 55 may include a cover inlet 55*a* through which the oil cooling the rotor 70 is introduced and a cover discharging port 55*b* for discharging the oil to the oil housing 300 disposed on the housing 10. The cover inlet 55*a* may be defined at the location adjacent to the hollow part 52 compared to the cover discharging port 55*b*. the cover discharging port 55*b* may be connected to the inner flow path 12 defined on the lower end of the housing 10, and the oil cooling the rotor 70 may be introduced into the first inlet 310 of the oil housing 300 through the cover inlet 55*a*, the oil recovery line 55, the cover discharging port 55*b*, and the inner flow path 12.

The cover inlet 55*a* may be defined on one side of the partition wall 51, and the cover discharging port 55*b* may be defined on the other side of the partition wall 51. One side of the partition wall 51 may mean the point adjacent to the rotary shaft 20, and the other side of the partition wall 51 may mean the point facing one side of the partition wall 51. The cover inlet 55*a* may be defined at the location overlapping the boundary between the stators 80, 90 and the rotor 70.

According to the exemplary embodiment of the present disclosure, the oil cooling the rotor 70 may be recovered to the oil housing 300 by forming the flow path inside the motor cover 50 without forming a separate flow path inside the housing 10.

As described above, while the exemplary embodiments of the present disclosure have been described with reference to the accompanying drawings, those skilled in the art to which the present disclosure pertains will understand that the present disclosure may be implemented in various specific forms without changing the technical spirit or the essential feature. Therefore, it should be understood that the aforementioned exemplary embodiments are illustrative and not limitative in all respects.

The invention claimed is:

1. A motor cover structure sealing a housing of a motor, the motor cover comprising:
   a partition wall positioned on one side of a stator disposed within the motor to contact a cover contacting the housing; and
   a body part mounted with the partition wall;
   wherein an oil recovery line is defined between the partition wall and the body part;
   wherein oil flows to the oil recovery line in a space of one side of a rotor disposed within the motor;
   wherein the oil recovery line comprises a cover inlet through which the oil cooling the rotor is introduced and a cover discharging port for discharging the oil to an oil housing disposed on the housing; and
   wherein a hollow part into which the rotary shaft of the motor is inserted, and a first concave part mounted with a sealing member for sealing between the motor cover and the housing are positioned in the body part, and wherein a second concave part connected to the first concave part and mounted with the sealing member is positioned in the partition wall.

2. The motor cover structure of claim 1, wherein the cover separates a space in which the stator and the rotor are disposed, and wherein a space between the stator and the housing is divided into:
   a first chamber defined by the cover disposed on one side of the stator and the partition wall;
   a second chamber defined by the cover disposed on one side of the stator, the stator, and the housing;
   a third chamber defined by a second cover disposed on the other side of the stator, the stator, and the housing; and
   a fourth chamber defined by the second cover disposed on the other side of the stator and the housing.

3. The motor cover structure of claim 2, wherein the partition wall is in contact with the cover such that the oil within the first chamber, the second chamber, the third chamber, and the fourth chamber is not directly introduced into the oil recovery line.

4. The motor cover structure of claim 1, wherein the oil cooling the rotor flows through the oil recovery line, and wherein the oil recovery line is connected to an inlet of the oil housing disposed on the housing.

5. The motor cover structure of claim 1, wherein the oil recovery line is positioned outside the motor cover compared to the location of the sealing member with respect to the direction in which the rotary shaft of the motor extends.

6. The motor cover structure of claim 1, wherein the cover inlet is positioned adjacent to the hollow part compared to the cover discharging port.

7. The motor cover structure of claim 1, wherein the oil recovery line is positioned at a location overlapping the stator in the direction in which the rotary shaft of the motor extends.

8. The motor cover structure of claim 1, wherein one side of the partition wall is positioned at a location spaced from a boundary between the stator and the rotor with respect to the rotary shaft.

* * * * *